United States Patent
Spaargaren et al.

[15] 3,665,172
[45] May 23, 1972

[54] CONTROL OF A PROCESS VARIABLE BY A COMPUTER AND A CONTROLLER WHICH REPLACES THE COMPUTER

[72] Inventors: Klaas Spaargaren; Aart Bijl, both of Amsterdam, Netherlands

[73] Assignee: Shell Oil Company, New York, N.Y.

[22] Filed: June 25, 1969

[21] Appl. No.: 836,463

[52] U.S. Cl. ..........................235/150.1, 318/564, 388/590, 318/591
[51] Int. Cl. ..........................................................G05b 7/00
[58] Field of Search..............235/151.1, 150.1; 318/20.075, 318/20.240, 20.245

[56] References Cited

UNITED STATES PATENTS

| | | | |
|---|---|---|---|
| 2,734,155 | 2/1956 | Schuck | 318/591 |
| 3,129,323 | 4/1964 | Stout et al. | 235/151.1 |
| 3,363,157 | 1/1968 | Rouvalis | 318/590 |
| 2,885,576 | 5/1959 | Nye, Jr. et al. | 318/610 X |
| 3,011,709 | 12/1961 | Jacoby | 235/151 |
| 3,582,621 | 6/1971 | Lawler | 235/151.1 |
| 3,582,631 | 6/1971 | Rijnsdorp | 235/151.1 |

FOREIGN PATENTS OR APPLICATIONS 2,390  1/1969  Japan..................................318/591

Primary Examiner—Eugene G. Botz
Attorney—Theodore E. Bieber and J. H. McCarthy

[57] ABSTRACT

A method and apparatus for controlling a process variable wherein the variable is controlled primarily by a digital computer but where a part of the control function is performed by an analog controller. When the control is by the computer, an output signal is passed intermittently from the computer to a memory amplifier, the output signal of which is a control signal that may be used for correcting the process variable. When control is by the controller, the memory amplifier operates as a summing amplifier for negative feedback control.

9 Claims, 6 Drawing Figures

INVENTORS:
KLAAS SPAARGAREN
AART BIJL
BY:

*Iwan E. Bixhy*

THEIR ATTORNEY

INVENTORS:
KLAAS SPAARGAREN
AART BIJL

BY:
THEIR ATTORNEY

INVENTORS:
KLAAS SPAARGAREN
AART BIJL
BY:
*Theodore E. Bieber*
THEIR ATTORNEY

CONTROL OF A PROCESS VARIABLE BY A COMPUTER AND A CONTROLLER WHICH REPLACES THE COMPUTER

BACKGROUND OF THE INVENTION

The present invention relates to a method and apparatus for controlling a process variable A in which this variable is controlled automatically by means of a computer and in which a controller is also used as a replacement for the computer; in which (when control is by the computer) an output signal is passed intermittently by the said computer to a memory amplifier, the output signal of which is passed as control signal to a correcting unit by means of which A can be influenced, while (when control is by the controller) the control signal for the correcting unit is produced by the said controller.

The method described above makes it possible for a process variable which is normally controlled by a computer to be automatically controlled for a period of time by a different means, viz., by the controller. In this case the controller is used whenever the computer fails or is partly or wholly out of operation for any reason. As a rule the computer controls a very large number of process variables at the same time, and for a substantial part of these variables it is necessary to provide a possibility of control by means of a controller. This may involve the use of several dozen, or even several hundred, controllers. These controllers involve a very large capital outlay, even if the simplest, only just suitable, commercial controllers are taken. It is the object of the present invention to make a substantial reduction in this capital outlay.

To this end, both in the case of control by the computer and of control by the controller, the control signal is supplied according to the invention by one and the same operational amplifier, which is used in the former case as a component of the memory amplifier, for which purpose the output voltage of the operational amplifier is fed back wholly or partly over a capacitance to its input, and which in the second case (as component of the controller) is fed back over a first impedance, while two signals which represent the measured value and a set value of A respectively, are passed with opposite signs via one or more further impedances to the input of the operational amplifier.

The circuit according to the invention comprises a connection to which an intermittent signal produced by a computer can be passed; a (first) operational amplifier, from the output of which a control signal for a correcting unit can be derived; a capacitance; two or more impedances; and switching elements which can adopt positions indicated by the letters P and Q and thereby effect such connections that in the position P the operational amplifier is fed back by means of the capacitance, while its input is connected with the said connection, and that in the position Q the operational amplifier is fed back by means of the first impedance, while its input and the second and any further impedance(s) are included in an input circuit by means of which signals B and F, which represent the measured value and a set value respectively of a controlled process variable A can be passed via this (these) impedance(s) to the input of the operational amplifier.

This circuit replaces the equipment required for the application of the known method, viz., a memory amplifier, a controller and some switchgear. If the costs of the operational amplifier and the capacitance are taken to be equal to the costs of the memory amplifier, the circuit involves on the one hand the saving of a controller, but on the other hand the extra costs of the impedances and some additional switchgear. The circuit part referred to earlier will in most cases only comprise one or two impedances which — like the first impedance — will almost always consist of one or two cheap components (resistors or capacitors). It is thus clear that with each circuit used approximately 75 percent of the price of a simple controller can be saved. In view of the large number of these circuits which may be necessary in a digital computer the total saving realizable by the use of the invention can be very great.

The method is preferably carried out in such a way that the method of control (for example by means of the computer or the controller) is set by means of switching elements which can be operated automatically (for instance by means of a safety system which checks the computer) and, if desired, manually. In this way it becomes possible, inter alia, to transfer the control automatically to the controller if the computer fails or does not get through its program satisfactorily or if other circumstances make this advisable.

It is also desirable to be able to switch off both the computer and the controller, the control signal subsequently being alterable manually, but otherwise remaining constant. For this purpose use is made of a circuit in which the switching elements can adopt a third position (R) whereby the operational amplifier is fed back by means of a capacitance, while the input of this amplifier is connected with a terminal to which a current source can be temporarily connected in order to alter the control signal.

The impedances to be used according to the invention determine the control action of the controller formed by means of these impedances. These impedances are chosen in such a way that a control action is obtained which can be used for the control of the variable A. It is preferred to use for the first impedance a capacitance or the series or parallel connection of a resistance and a capacitance.

In many cases it is preferable, for the sake of continuity of the control, to carry out the method in such a way that with control by the controller the signal which represents the set value of A is derived from a memory element in which is stored a value of A measured during or shortly prior to a change-over to this method of control. For this purpose use is preferably made of a circuit, a second operational amplifier (for the supply of the signal F) being also included in the above-mentioned input circuit of the operational amplifier, which second operational amplifier is connected up as a memory amplifier when the switching elements are in position Q, for which purpose it is fed back by means of a capacitance.

By an "operational amplifier" is understood an amplifier with a relatively high input impedance, a relatively high amplification factor and preferably a relatively low output impedance, the amplification factor being negative if the input and the output of the amplifier have a common pole.

The term "correcting unit" is used to denote elements by means of which the process variable A to be controlled can be directly or indirectly influenced. These elements may be simple (for instance a control valve), but they may also comprise a servo system (for example a control valve provided with a valve positioner; a rheostat or regulating transformer with servo control) and even a control circuit for controlling a process variable which influences A, which control circuit is therefore used in cascade with the computer or the controller.

SUMMARY OF THE INVENTION

Basically, the invention consists of a method for controlling a process variable in which the variable is controlled both by a digital computer and by an analog controller. When controlled by the digital computer, an output signal is passed intermittently by the computer to a memory amplifier. The memory amplifier has an output signal that is supplied to a correcting unit which in turn controls the process variable. When control is by the analog controller, the control signal for the correcting unit is produced by the controller itself and is characterized by the fact that the operational amplifier may be used both for the digital control and the analog control. For digital control, the output voltage of the operational amplifier is fed back over a capacitance to the input, whereas when the operational amplifier is used as a component of the controller, the output signal is fed back over a first impedance, while two signals which represent the measured value and a set value of the control parameter, are passed via one or more further impedances to the input of the operational amplifier.

BRIEF DESCRIPTION OF THE DRAWING

The invention will be further elucidated with reference to a number of diagrams which illustrate schematically both the method and the circuit according to the invention.

FIG. 1 shows schematically a process 10 and a device by means of which one of the process variables (A) is controlled according to the invention. For controlling purposes the variable A is measured by a meter 12, the output signal B of which represents the measured value of A. The value of A can be influenced by altering the setting C of a correcting unit 14. This unit is set by passing to it as control signal the output voltage D of an operational amplifier 16. The manner in which the amplifier 16 arrives at the control signal D depends on the positions of three switches 18,20 and 22. As will be described in further detail below, when these switches are in the position P the process variable A is controlled by a digital computer 24, while the position Q means that the control of A is effected by a controller.

Figure 1:
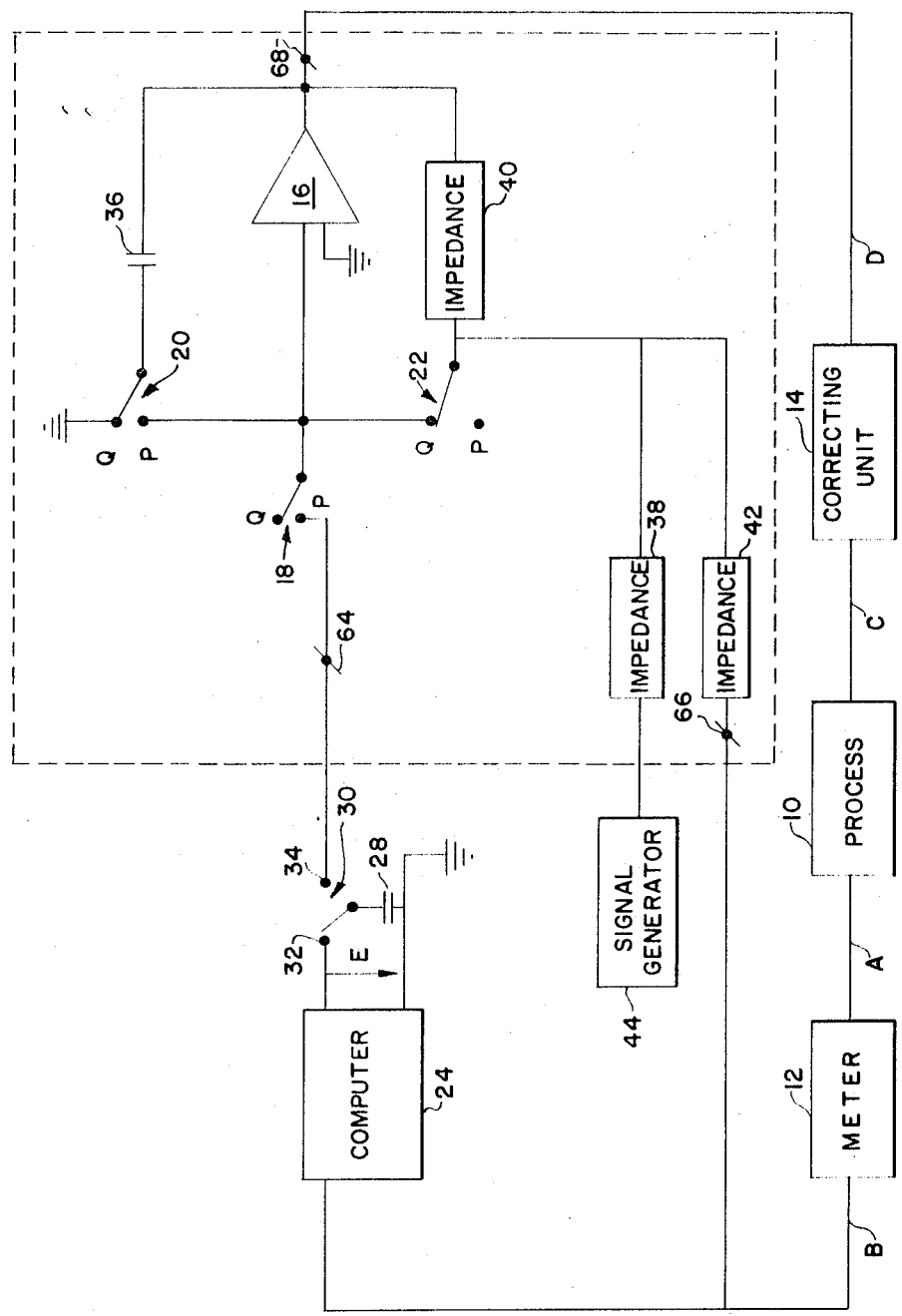
FIGS. 1 and 2 each give a complete representation of an embodiment of the invention, while FIGS. 3 to 6 inclusive show diagrams each of which can replace a part of FIG. 1 and FIG. 2 and thus represent further embodiments of the invention.

Attention is first given to the case in which the switches 18, 20 and 22 are in position P. The signal B, which represents the measured value of A, is passed to an input of the digital computer 24. This computer intermittently calculates the desired alteration of the control signal D. This calculation is based on the measured value of A and on a desired value of A, which has, for instance, been supplied to computer 24 at an earlier stage, and has since been stored in the computer's memory. The nature of the calculation is determined by the desired control action. The computer is so designed that at its output 26 a series of charges (current pulses with defined charge contents) can be derived, each of which represents by its value the result of a calculation, in the case in question a calculated alteration of the control signal D. In the case shown in FIG. 1 this is effected in that the computer 24 intermittently generates a direct current E, the value of which corresponds with a calculated alteration of control signal D and is transmitted to a capacitance 28 via a switch 30 having positions 32 and 34. Switch 30 is set by computer 24 alternately in the position shown and in the position not shown. The charge of capacitance 28, which assumes a value proportional to that of E when switch 30 is in position 32, becomes available as an output signal of the computer whenever switch 30 has been set in position 34.

In the position P of the switches, the operational amplifier 16 receives a feed back via switch 20 and capacitance 36. This combination constitutes memory amplifier. The voltage D across the output of amplifier 16 substantially retains its value for a considerable time if no charge is supplied to or withdrawn from amplifier 16. This is true since as a result of the large, negative amplification factor of operational amplifier 16 the voltage D assumes a value which is virtually identical with the voltage across capacitance 36. Capacitance 36, however, loses its charge, and thus its voltage, as a result of two causes, viz., (1) the leakage current of the capacitor(s) and (2) the input current to amplifier 16. The change in D thus effected takes place very gradually, however, since the two currents mentioned are very small: the leakage current is small since capacitors with a good insulation are used, and the input current is small because the voltage across the input of operational amplifier 16 is very small and the actual input impedance of an operation amplifier is very large. On each occasion that the capacitance 28 is connected with the input of memory amplifier 16, by switch 30, the voltage D is altered by an amount such that the capacitance 28 transfers its (positive or negative) charge virtually entirely to the capacitance 36. The alteration in D necessary for this to happen is substantially equal to the quotient of the charge originally present on capacitor 28 and the size of the capacitor 36.

It follows from the above that when the switches 18, 20 and 22 are in position P, the control signal D undergoes a change whenever the intermittent output signal from computer 24 is supplied to memory amplifier 16. The change corresponds to the change in D calculated by the computer. In the period between these changes the control signal D retains its most recently assumed value.

When the switches 18, 20 and 22 are in position Q output 26 of computer 24 is disconnected from the rest of the circuit so that no further control is effected by the computer. Instead, operational amplifier 16 and three impedances 38, 40 and 42 now function together as controller.

To this controller are supplied two electric signals B and F, which represents respectively the measured and a set value of the variable A. The signal B is obtained from meter 12, the signal F from a signal generator 44, on which the value of F can be set. When the switches are in position Q these signals are passed via impedances 38 and 40 respectively and via switch 22 to the input of the operation amplifier 16. Meter 12 and signal generator 44 are connected in such a way that signals B and F are passed to the input of amplifier 16 with opposite signs. The output voltage D is fed back an impedance 40 to the input of amplifier 16.

The relationship of the impedances 38 and 40 determines how the output signal D of the controller reacts to changes in the variable A. Depending on the control action desired for the control of A, a definite choice is made in respect of these impedances. Widely used types of control action can be obtained by restricting the choice in respect of each of the impedances 38 and 40 to a resistance, a capacitance or the series or parallel connection thereof. It is normally desirable for the output signal D to react to the signals B and F in the same manner but with opposite signs. In this case an impedance 38 is chosen which corresponds with the impedance 40.

When the control is by the controller the output voltage of amplifier 16 is communicated to capacitance 36. When the switches are in position Q this capacitance is grounded via switch 20. After the change-over to position P the output signal D assumes virtually the same value as before the change-over, a fact which is of importance because in this way an undesirable jump in the signal D is avoided. During the change-over, however, the voltage on capacitance 36 must not be lost. This voltage loss will occur if the switching times of switches 18, 20 and 22 are not correctly attuned to each other so that for short periods faulty connections exist to which amplifier 16 reacts. If electronic switches are used for 18, 20 and 22 the change-over time is normally so short that owing to its slow response time caused by parasitic capacitances the amplifier is not troubled by temporary faulty connections. If, however, the change-over time is relatively long as would be the case with electromagnetic switches and the response time of the amplifier 16 rapid, measures must be taken to prevent the voltage loss of the capacitance 36, such as correctly attuning the switching moments of the switches 18, 20 and 22 to each other, or building an artificial "parasitic" capacitance into amplifier 16.

The coupling via impedances 38, 40 and 42 between meter 12, signal generator 44 and the output of amplifier 16 continues to exist when the switches are in position P, but is not used in this case. Should this coupling give rise to an undesired interaction between the signals F, F and D — in practice this will not normally happen — this interaction can always be eliminated by connecting the unused contact of switch 22 with the common neutral point of the circuit.

By way of variation of the above the computer can also be designed in such a way that the voltage E is constant, while the size of the capacitance 28 is set by the computer in accordance with the result of a calculation.

The computer is provided with a safety system which checks the correct functioning of the computer. For this reason switches are used for 18, 20 and 22 which can be operated both by hand and by the safety system. The safety system may, for instance, be a circuit, which has to be reactivated continually and which gives an alarm signal if no activation has taken place during a given period. The computer program is so designed that if it runs properly, the alarm circuit is always activated within the given period of time. If the program runs improperly, the alarm comes into action, so that the switches are switched over from P to Q, and the controller takes over the control from the computer. None of these features are shown in the drawing.

Figure 2:
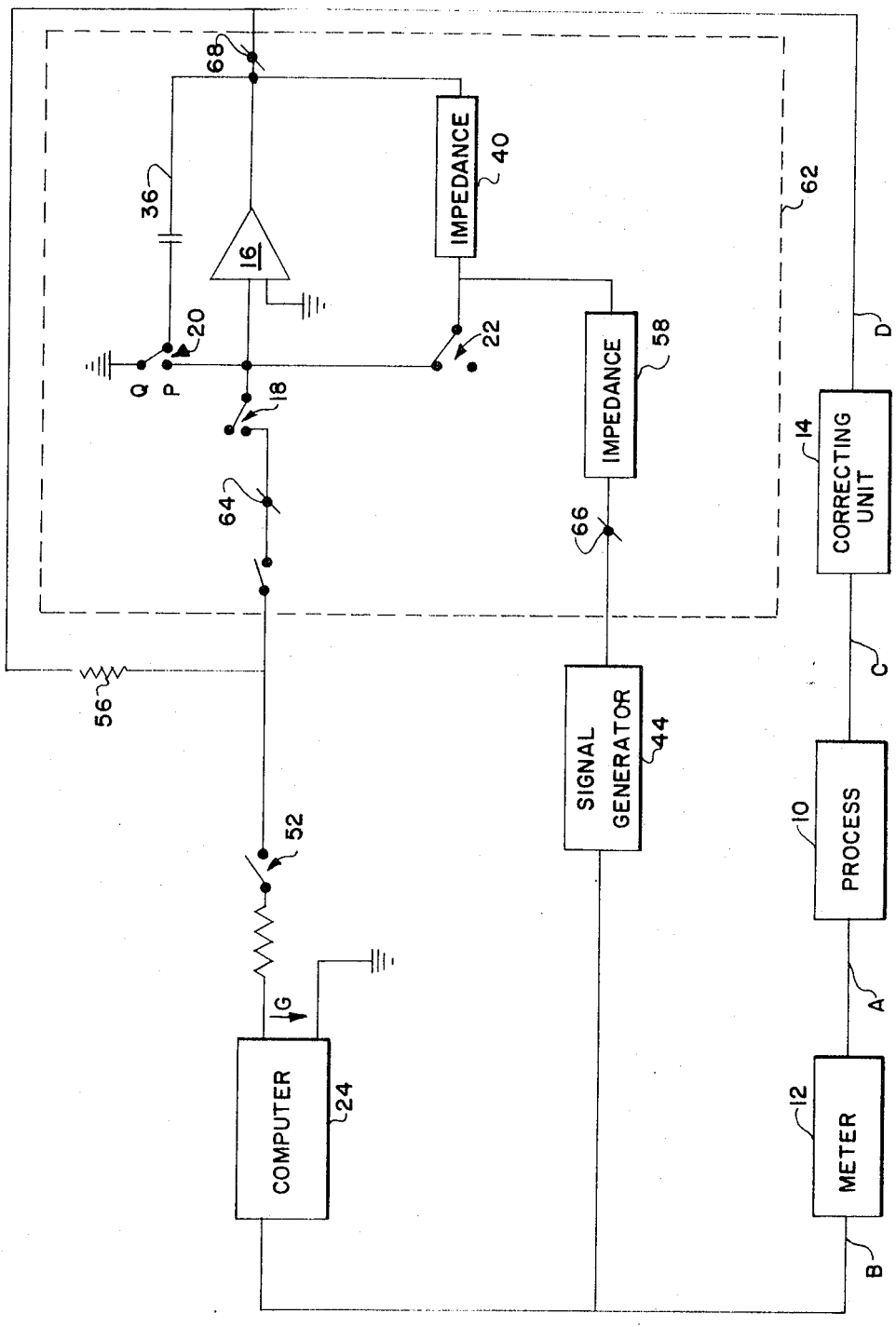

FIG. 2 shows schematically a second device for the control of A, which corresponds in many respects to the device shown in FIG. 1. Insofar as these Figures are identical, the same reference numerals have been used. However, FIG. 2 differs from FIG. 1 in two respects.

In the first place the computer 24 in this case calculates not the alteration in the control signal D, but the control signal D itself. This means that when the switches 18, 20 and 22 are in position P the output signal from computer 24 must be supplied to the memory amplifier 16, in a different manner. For this reason the computer is now so designed that from its output 26 an electric direct current can be intermittently derived, the value of which always corresponds with the result of a calculation, in this case the calculated value of D. This happens because computer 24 on each occasion generates a direct current, G, the value of which corresponds with a calculated value of D, and which is connected to the input of the operational amplifier 16 via a resistance 50, switches 52 and 54 and the switch 18. In this way a resistance 56 is temporarily connected in parallel, by means of the switch 52, with the capacitance 36, by means of which the operational amplifier 16 receives a feedback signal. The switches 52 and 54 are temporarily closed by the computer 24, whenever the voltage G is present. In this case the combination resistance 50, amplifier 16, capacitor 36 and resistor 56 function as a delayed phase inverter amplifier. By a correct selection of the values of capacitance 36 and resistance 56 the resultant delay can be kept small, so that the output voltage D reaches a new value corresponding with the voltage G before the switches 52 and 54 are again opened by the computer. This new value of the control signal D is retained until the switches 52 and 54 are again closed, etc.

By way of variation of the above it is also possible for the voltage G to have a constant value, while the resistance 50 is variable and is set by the computer in accordance with the result of the calculation.

The second difference between FIG. 1 and 2 relates to the manner in which the signals B and F are supplied to the input of amplifier 16 when switches 18, 20 and 22 are in position Q. With reference to FIG. 2 the meter 12 and signal generator 44 are connected in series, in such a way that the difference between signals B and F is created. This difference is passed via an impedance 58 and switch 22 to the input of amplifier 16. The controller is now formed by the combination impedance 58, amplifier 16 and impedance 40. The relationship of the impedances 40 and 58 determines the control action.

In both FIGS. 1 and 2 the part of the device that comprises the components of the memory element and the amplifier is surrounded by a broken line. These parts 60 and 62 are interchangeable. Other circuits which may be used instead of 60 and 62 are shown in FIGS. 3 to 6 inclusive. In each of these circuits the output signal of the computer is passed to a connection 64 and the measured value of A (the signal B) to a connection 66; the control signal D is obtained from a connection 68.

Figure 3:
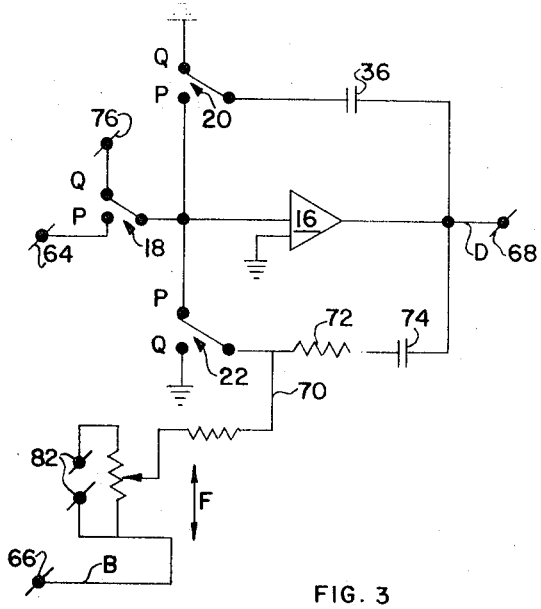

FIG. 3 shows a particular case of the circuit 62. For the impedance 58 a resistance 70 has been chosen, while for the impedance 40 use has been made of the series connection of a resistance 72 and a capacitance 74. When the switches are in position Q this combination of impedances provides a controller with proportional and integral control action. The signal F is set by means of a potentiometer 80 which is supplied from a direct current source connected to the terminals 82. When the change-over from position P to position Q takes place a jump may occur in the output voltage D. In order to reduce this jump when control is by the computer the series combination of resistor 72 and capacitor 74 is connected across the output of amplifier 16 by means of switch 22, so that the voltage across capacitance 74 follows the voltage D, albeit somewhat delayed. What remains of the jump in D is caused partly by this delay and partly by the proportional action of the controller. As far as the delay is concerned, the jump can be eliminated by using a fourth switch (not shown), which adopts position P or Q simultaneously with switches 18, 20 and 22 and short-circuits the resistance 72 in position P. FIG. 3 also shows a terminal 76, to which a direct current may be temporarily supplied whenever it is desired to change the control signal D during a period of control by the controller.

Figure 4:
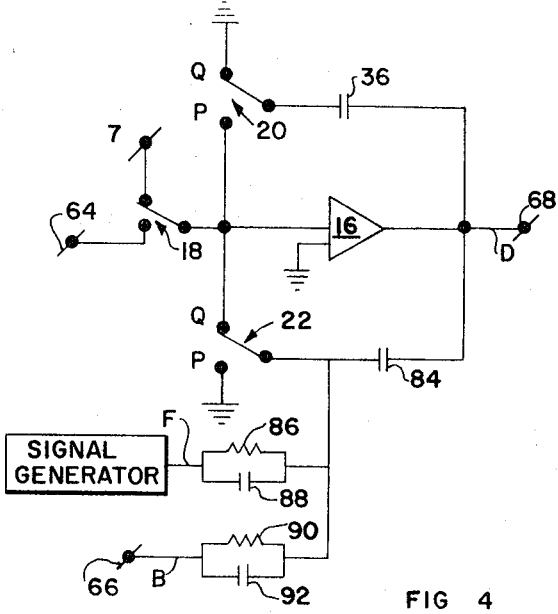

Like FIG. 3, FIG. 4 shows a circuit which yields a controller with proportional and integral action when the switches are in position Q. The circuit of FIG. 4 is a special case of the circuit 60 obtained by using a capacitance 84 for impedance 40, the parallel connection of a resistance 86 and a capacitance 88 for impedance 38, and the parallel connection of a resistance 90 and a capacitance 92 for impedance 42. In order to cause the output signal D to reach similarly to the signals B and F the parallel combinations of resistor 86 and capacitor 88, and resistor 90 and capacitor 92 are given the same time constant. In order to avoid jumps in the control signal D during the change-over from position P to position Q and vice-versa the measure discussed above is applied with respect to the two capacitances 36 and 84; when these capacitances are not being used for the feedback of operational amplifier 16, they are connected across the output of the amplifier.

By including in the circuit shown in FIG. 4 a resistance connected in parallel with the capacitance 84 and ensuring that the time constant of this parallel connection corresponds with that of the two other parallel combinations 86, 88, and 90, 92 a controller with proportional action is obtained in the position Q. The time constant is then preferably given a relatively large value in order to achieve a gradual change in the signal D during the change-over to the position Q.

If it is permissible for capacitance 84 in the controllers described with reference to FIG. 4 to have the same value as capacitance 36, capacitance 84 may be omitted and the amplifier fed back in the positions P and Q by means of capacitance 36. The switch 20 can then be omitted.

Figure 5:
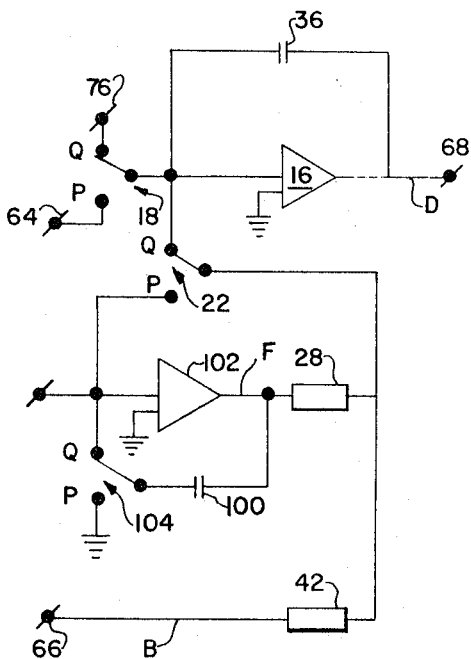
FIGS. 5 and 6 relate to cases in which the measured value of A is stored in a memory element.
Figure 6:
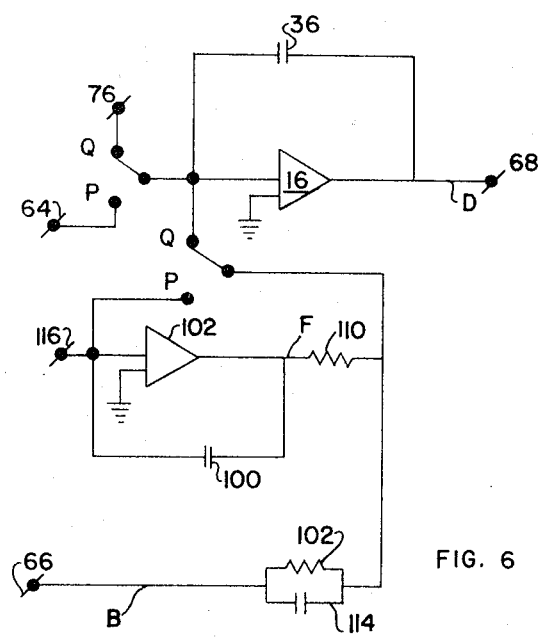

FIGS. 5 and 6 show circuits in which the impedance 40 of FIG. 1 is identical with capacitance 36. Another feature not related hereto, shown by way of example in these Figures, is the use of a memory element in which is stored a value of the variable A measured during or shortly prior to the change-over to the position Q of the switches, and from which the signal F, representing the set value of A, is derived during the period in which the controller controls the variable A.

In the circuit shown in FIG. 5 the capacitance 100 constitutes the memory element. When the computer controls the variable A the measured value of A is passed via the impedance 42 and the switch 22 to the input of a second operational amplifier 102. In this case the impedance 28 connects the output of this amplifier with its input, which feedback can be interrupted by switch 22. The impedances 28 and 42 are chosen in such a way that the combination impedances 28 and 42 and amplifier 102 constitute a phase-inverter amplifier. In practice this means that the relationship between these two impedances is constant for the frequencies occurring in signal B (at least for the lower frequencies occurring in B). The capacitance 100 is connected across the output of amplifier 102 by means of a switch 104 which adopts the positions P and Q at the same time as the switches 18 and 22. In this way capacitance 26 acquires a voltage which corresponds with the measured value of A.

When the change-over to position Q takes place the supply of signal B to amplifier 102 is omitted and impedance 28 is replaced by the charge capacitance 100. If precautions similar to those described with reference to FIG. 1 for capacitance 36 are taken, capacitance 100 does not lose its voltage during the change-over, and after the change-over the output voltage of amplifier 102 is virtually the same as previously. The combination capacitor 100 and amplifier 102 now functions as memory amplifier and produces a signal which represents for a considerable time the last measured value of A communicated to the capacitance 100. Signal F is passed as set value of A via impedance 28 to the input of amplifier 16, with a sign opposite to that with which the measured value of A is now passed to this same input via impedance 42.

If desired, signal F can be changed during a period of control by the controller by passing a positive or negative direct current via a connection 106 to the input of the memory amplifier 102, until F has acquired the desired new value. This feature can also be utilized to correct the signal F whenever the charge originally stored in the capacitance 100 has declined to an impermissible extent owing to the fact that the computer has been out of operation for a long period.

In the circuit shown in FIG. 5 the impedances 28 and 42 have a dual function: when the switches are in position P they serve to connect the amplifier 102 as a phase-inverter amplifier, and when the switches are in position Q they function as input impedances of amplifier 16. In each of the positions, P and Q, a separate pair of impedances can also be used, but this has the drawback that these sets of impedances have to be accurately matched to one another. With the circuit as shown in FIG. 5 this is not necessary: the use of the same impedances means that the tuning obtained is the best conceivable.

It may sometimes be desirable on changing over from computer to controller for the value of the variable A stored in the memory element not to be the most recent one. This will be the case for instance if the possibility exists that incorrect functioning of the computer is only discovered once the controlled process 10 has already suffered consequences of this error. It is then preferable to store in the memory element a value which has been influenced only slightly or not at all by this error. To this end the impedances 28 and 42 are so chosen that the phase-inverter amplifier operates with some delay.

It is also possible to omit the switch 104 in FIG. 5 and to connect the capacitance 100 permanently with the input and output of amplifier 102. When the switches 18 and 22 are in position P the impedance 28 is connected in parallel with the capacitance 100. In order to give this capacitance the correct voltage amplifier 102 must again be connected as a phase-inverter amplifier, but now in combination with impedances 28 and 42 and capacitance 100. This will lead to a different selection of the impedances 28 and 42. FIG. 6 shows an example of this variant of FIG. 5.

With reference to FIG. 6, when switches 18 and 22 are in position P amplifier 102 is fed back by means of the parallel combination of a resistance 110 and capacitance 100, while the signal B is passed to the input of this amplifier via the parallel combination of a resistance 112 and a capacitance 114. In order to function as a phase-inverter amplifier, the two parallel circuits must have approximately the same time constant. When switches 18 and 22 are in position Q, the measured value of A is passed via the parallel combination resistor 112 of capacitor 114 and the set value of A via the resistance 110, to the input of the amplifier 16. The controller has proportional and integral control action with respect to the signal B. However, it reacts to any changes in the signal F which can be effected by means of a current source temporarily connected at 116 with a gradual alteration of the control signal D, a feature which is often desirable in practice.

In some cases it will be desirable to have the possibility of putting both the computer and the controller out of operation, while the control signal D must be manually alterable, while otherwise remaining unchanged. In the circuits shown in FIGS. 1 to 6 inclusive this can be achieved by including an extra selector switch for example between the connection 64 and the switch 18, by means of which selector switch either the output of the computer or the output of a current source which can be switched on and off is connected with the contact of switch 18 appropriate to position P. If the current source is selected with this additional switch, both the computer and the controller are out of action when the other switches are in the position P, while the control signal D is supplied by amplifier 16 and capacitor 36 which function as a memory element as long as the current source is switched off. By temporarily switching on the current source the control signal D can be changed. The switch positions, at which the amplifier 16 is connected with the connection for the current source represent the "position R of the switching elments" referred to earlier.

It is of course possible to use combinations of separate switches instead of the selector switches 18, 20, 22, 34 and 104 shown in the Figures and the additional selector switch mentioned above. Although the terminology and symbols used suggest electromechanical or electromagnetic switches, other types of switches such as electronic may also be used.

We claim as our invention:

1. A system for controlling a process variable of a process, comprising:

a meter for measuring said process variable, said meter being operatively connected to said process and adapted to generate an output signal proportional to the measured value of said process variable;

a digital computer operatively connected to said meter so as to receive the output signal thereof, said computer being adapted to produce an intermittent output signal proportional to changes that must be made in said process;

a signal generator adapted to generate a signal proportional to the set value of said process variable;

circuit means having input means connected to the output of said computer, to the output of said signal generator, and to the output of said meter, said circuit means including 1. an operational amplifier having an input and an output;
2. a plurality of impedances;
3. switching means, said switching means being connected between said impedances and the input of said operational amplifier and adapted to operate such that when said switching means are in one position the operational amplifier receives an output signal from the computer and said process is controlled by said computer but when said switches are in another position, said process is controlled by said operational amplifier in combination with a portion of said impedances such that said set value signal and said measured value signal are supplied to the input of said operational amplifier with opposite polarities;
4. separate feedback impedance means included in the plurality of impedances and connecting the output of the operation amplifier to its input when the switching means is in said one position or said other position;

and a correcting unit connected between the output of said circuit means and said process, said process, said correcting unit being adapted to control said process variable in accordance with the output signal of said operational amplifier.

2. The system of claim 1 wherein said circuit means comprises:

a capacitor included as one of the separate feedback impedance means;

a first switch included in said switching means having a first and second position, the series combination of said capacitor and said first switch being connected between said input and output of said operational amplifier;

a first impedance means included in said plurality of impedances as one of the separate feedback impedance means;

a second switch included in said switching means, said first impedance means and said second switch being serially connected between said input and said output of said operational amplifier, only one of said first and second switches being closed at one time;

a second impedance means included in said plurality of impedances, said second impedance means connected between the output of said signal generator and the common node between said first impedance means and second switch;

a third switch included in said switching means, said third switch connected between the input of said operational amplifier and said computer output.

3. The system of claim 1 wherein said computer output signal comprises a series of current pulses with defined charge contents, each pulse representing a calculated alteration of the control signal.

4. The system of claim 2 wherein said first impedance means comprises a capacitance;

said second impedance means comprises the parallel combination of a resistance and a capacitance; and, said third impedance means comprises the parallel combination of a resistance and a capacitance.

5. The system of claim 1 wherein said signal generator includes a circuit comprising an operational amplifier, a capacitor, and a switch, said capacitor and switch connected serially between said input and said output of said operational amplifier, said switch having two positions, one position connecting said capacitor in a completed circuit between said input and said output of said amplifier, the other position of said switch grounding said capacitor.

6. The system of claim 2 wherein said second impedance means comprises a resistance; and, said third impedance means comprises the parallel combination of a resistance and a capacitance.

7. The system of claim 1 wherein said circuit means comprises:

a capacitor included in said plurality of impedances as one of the separate feedback impedance means;

a first switch included in said switching means having a first and second position, the series combination of said capacitor and said first switch being connected between said input and output of said operational amplifier;

a first impedance means included in said plurality of impedances as another of the separate feedback impedance means;

a second switch included in said switching means, said first impedance means and said second switch being serially connected between said input and said output of said operational amplifier, only one of said first and second switches being closed at one time;

a second impedance means included in said plurality of impedances, said second impedance means connected between said signal generator and the common node between said first impedance means and second switch;

a third switch included in said switching means, said third switch connected between the input of said operational amplifier and said computer output; and, wherein said signal generator is connected in series between said meter and said second impedance means in such a manner that said meter output signal is subtracted from said signal generator signal.

8. The system of claim 7 wherein said computer output signal comprises a direct current the output of which corresponds with a calculated value of the control signal.

9. The system of claim 7 wherein said signal generator comprises a source of dc power connected across a rheostat;

said first impedance means comprises a series combination of a resistance and a capacitance; and, said second impedance means comprises a resistance.

* * * * *